G. W. LEWTHWAITE.
Animal-Trap.

No. 221,329. Patented Nov. 4, 1879.

WITNESSES:
Francis McArdle.
C. Sedgwick

INVENTOR:
G. W. Lewthwaite
BY Munn & Co.
ATTORNEYS.

UNITED STATES PATENT OFFICE.

GEORGE W. LEWTHWAITE, OF FORT MILLER, NEW YORK.

IMPROVEMENT IN ANIMAL-TRAPS.

Specification forming part of Letters Patent No. 221,329, dated November 4, 1879; application filed June 12, 1879.

*To all whom it may concern:*

Be it known that I, GEORGE W. LEWTHWAITE, of Fort Miller, in the county of Washington and State of New York, have invented a new and Improved Animal-Trap, of which the following is a specification.

Figure 1:
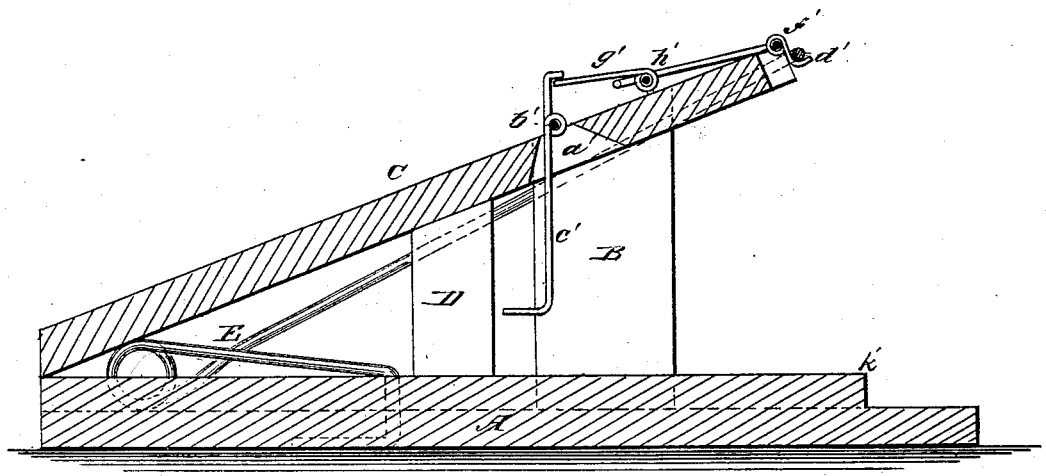
Figure 2:
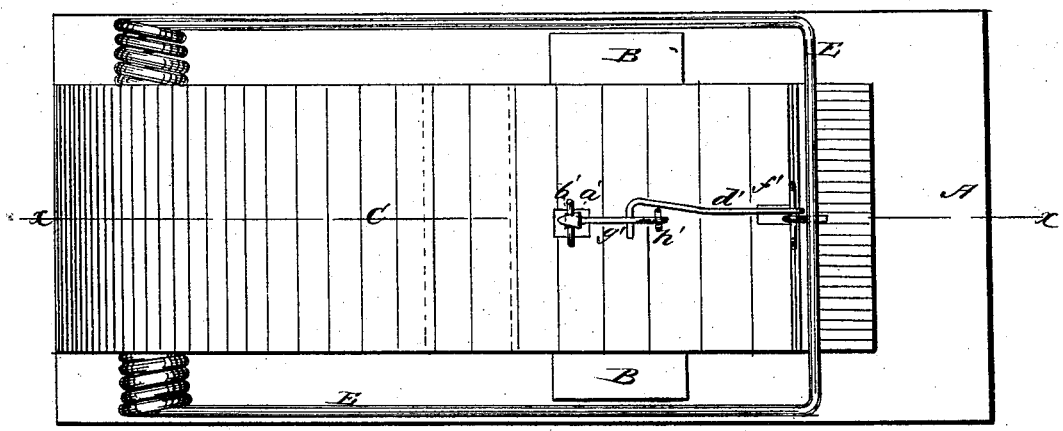

Figure 1 is a sectional side elevation of the trap on line $x\,x$, Fig. 2. Fig. 2 is a plan of the same.

Similar letters of reference indicate corresponding parts.

The object of this invention is to furnish a strong, efficient, and durable trap for rats and other vermin.

The invention consists in an animal-trap formed of a base-board rabbeted at the front and sides, and provided with side pieces, an inclined top having a hole for bait-rod, a bait-rod, and a spring connected with the bait-rod by a lever, as hereinafter more fully described.

In the drawings, A represents the base-board of the trap, rabbeted on the front and sides, so as to leave a raised central portion, against the sides of which are fastened, by nails or otherwise, two side pieces, B B, between the upper ends of which is fastened the inclined top C of the trap, whose rear end is nailed or otherwise attached to the rear of the base-board. A further support is furnished to the top by the brace D, that rests on the base. Secured by nails or otherwise across hole $a'$ in the top of the trap is a rod or staple, $b'$, and suspended from this is the bait-hook $c'$.

The spring hook and lever $d'$ swing on a staple, $f'$, inserted in the front edge of the top, and a smaller lever, $g'$, is held by a staple, $h'$. A powerful coiled spring, E, has its ends secured by being passed through the base and bent on its under side, while its square loop extends along the sides and front of the base.

The trap is set—the spring raised and held—in the usual manner, by the engagement of the hook $c'$, hook and lever $d'$, and lever $g'$, as shown in the drawings, the lever $g'$ making the holding of the spring more unstable than if the hook and lever $d'$ were directly connected with $c'$; or the strap can be made without the lever $g'$ and the lever $d'$, and allowed to connect with $c'$.

The side pieces, B, prevent the rat or other vermin from reaching the bait from the sides of the trap, and the spaces left between B and D admit light, so that the bait may be easily seen from the front.

When a rat springs the trap he is caught and held by the springs E down upon the sharp edge $k'$ of the base, in such a position that he cannot get away, and so that the pressure of the spring shall operate most effectively.

Having thus described my invention, I claim as new and desire to secure by Letters Patent—

An animal-trap consisting of the base-board A, rabbeted at front and on the sides, the side pieces, B B, the inclined top C having hole $a'$, the bait-rod $b'$ $c'$, the levers $d'$ $g'$, and the spring E, as shown and described.

GEORGE WALTER LEWTHWAITE.

Witnesses:
    CHARLES E. ELLSWORTH,
    JOHN THORPE.